US011714782B2

(12) United States Patent
Subramanian et al.

(10) Patent No.: US 11,714,782 B2
(45) Date of Patent: Aug. 1, 2023

(54) COORDINATING SNAPSHOT OPERATIONS ACROSS MULTIPLE FILE SYSTEMS

(71) Applicant: NetApp Inc., Sunnyvale, CA (US)

(72) Inventors: Ananthan Subramanian, San Ramon, CA (US); Matthew Fontaine Curtis-Maury, Apex, NC (US); Ram Kesavan, Los Altos, CA (US); Rupa Natarajan, Sunnyvale, CA (US); Vinay Devadas, Apex, NC (US)

(73) Assignee: NetApp, Inc., San Jose, CA (US)

(*) Notice: Subject to any disclaimer, the term of this patent is extended or adjusted under 35 U.S.C. 154(b) by 168 days.

(21) Appl. No.: 17/216,940

(22) Filed: Mar. 30, 2021

(65) Prior Publication Data

US 2022/0318188 A1  Oct. 6, 2022

(51) Int. Cl.
G06F 16/11 (2019.01)
(52) U.S. Cl.
CPC .................. G06F 16/128 (2019.01)
(58) Field of Classification Search
CPC ........ G06F 16/128; G06F 16/11; G06F 11/14; G06F 11/16
See application file for complete search history.

(56) References Cited

U.S. PATENT DOCUMENTS

| 7,039,663 | B1* | 5/2006 | Federwisch | H04L 67/1095 |
| 8,996,460 | B1* | 3/2015 | Frank | G06F 11/14 707/681 |
| 9,690,791 | B1* | 6/2017 | Chopra | G06F 11/1464 |
| 9,824,095 | B1* | 11/2017 | Taylor | G06F 16/11 |
| 10,248,336 | B1* | 4/2019 | Koujalagi | G06F 3/0608 |
| 10,496,487 | B1* | 12/2019 | Natanzon | G06F 11/1451 |
| 10,725,967 | B1* | 7/2020 | Natanzon | G06F 16/128 |
| 10,929,022 | B2* | 2/2021 | Goel | G06F 3/0665 |
| 11,226,869 | B2* | 1/2022 | Subramanian | G06F 3/067 |
| 2003/0182312 | A1* | 9/2003 | Chen | G06F 16/128 |
| 2014/0006354 | A1* | 1/2014 | Parkison | G06F 16/183 707/661 |
| 2014/0081911 | A1* | 3/2014 | Deshpande | G06F 3/067 707/610 |
| 2014/0149354 | A1* | 5/2014 | Chan | G06F 9/455 707/639 |
| 2016/0342609 | A1* | 11/2016 | Jibbe | G06F 16/128 |
| 2017/0031614 | A1* | 2/2017 | Katiyar | G06F 3/0643 |
| 2017/0235506 | A1* | 8/2017 | Thiam | G06F 3/0665 711/162 |
| 2017/0308305 | A1* | 10/2017 | Goel | G06F 3/0641 |

(Continued)

Primary Examiner — Robert W Beausoliel, Jr.
Assistant Examiner — Susan F Rayyan
(74) Attorney, Agent, or Firm — Cooper Legal Group, LLC

(57) ABSTRACT

Techniques are provided for coordinating snapshot operations across multiple file systems. A notification may be received that a snapshot of data stored across a persistent memory file system and a storage file system is to be generated. Forwarding, of modify operations from a persistent memory tier to a file system tier for execution through the storage file system, may be enabled. Framing may be initiated to notify the storage file system of blocks within the persistent memory file system that comprise more up-to-date data than corresponding blocks within the storage file system. In response to the framing completing, a consistency point operation is performed to create the snapshot and to create a snapshot image as part of the snapshot.

23 Claims, 12 Drawing Sheets

(56) References Cited

U.S. PATENT DOCUMENTS

| | | | |
|---|---|---|---|
| 2019/0034092 A1* | 1/2019 | DeKoning | G06F 3/067 |
| 2019/0188090 A1* | 6/2019 | Mukku | G06F 12/0253 |
| 2019/0332574 A1* | 10/2019 | Puri | G06F 3/0671 |
| 2019/0340083 A1* | 11/2019 | Ou-Yang | G06F 11/1469 |
| 2020/0104216 A1* | 4/2020 | Wang | G06F 16/128 |
| 2021/0109896 A1* | 4/2021 | Shemer | G06F 11/1471 |
| 2021/0165575 A1* | 6/2021 | Hutcheson, Jr. | G06F 11/1451 |
| 2021/0209059 A1* | 7/2021 | Jones | G06F 16/128 |
| 2021/0240660 A1* | 8/2021 | Khandkar | G06F 11/2038 |
| 2022/0317921 A1* | 10/2022 | Subramanian | G06F 3/0659 |
| 2022/0318188 A1* | 10/2022 | Subramanian | G06F 16/128 |

\* cited by examiner

US 11,714,782 B2

COORDINATING SNAPSHOT OPERATIONS ACROSS MULTIPLE FILE SYSTEMS

BACKGROUND

A node, such as a server, a computing device, a virtual machine, a cloud service, etc., may host a storage operating system. The storage operating system may be configured to store data on behalf of client devices, such as within volumes, aggregates, storage devices, cloud storage, locally attached storage, etc. In this way, a client can issue read and write operations to the storage operating system of the node in order to read data from storage or write data to the storage. The storage operating system may implement a storage file system through which the data is organized and accessible to the client devices. The storage file system may be tailored for managing the storage and access to data within a particular type of storage media, such as block-addressable storage media of hard drives, solid state drives, and/or other storage. The storage media and the storage file system may be managed by a file system tier of the node. The node may also comprise other types of storage media, such as persistent memory that provides relatively lower latency compared to the storage media managed by the file system tier. The persistent memory may be byte-addressable, and is managed by a persistent memory tier tailored for the performance and persistence semantics of the persistent memory.

DETAILED DESCRIPTION

Figure 1:
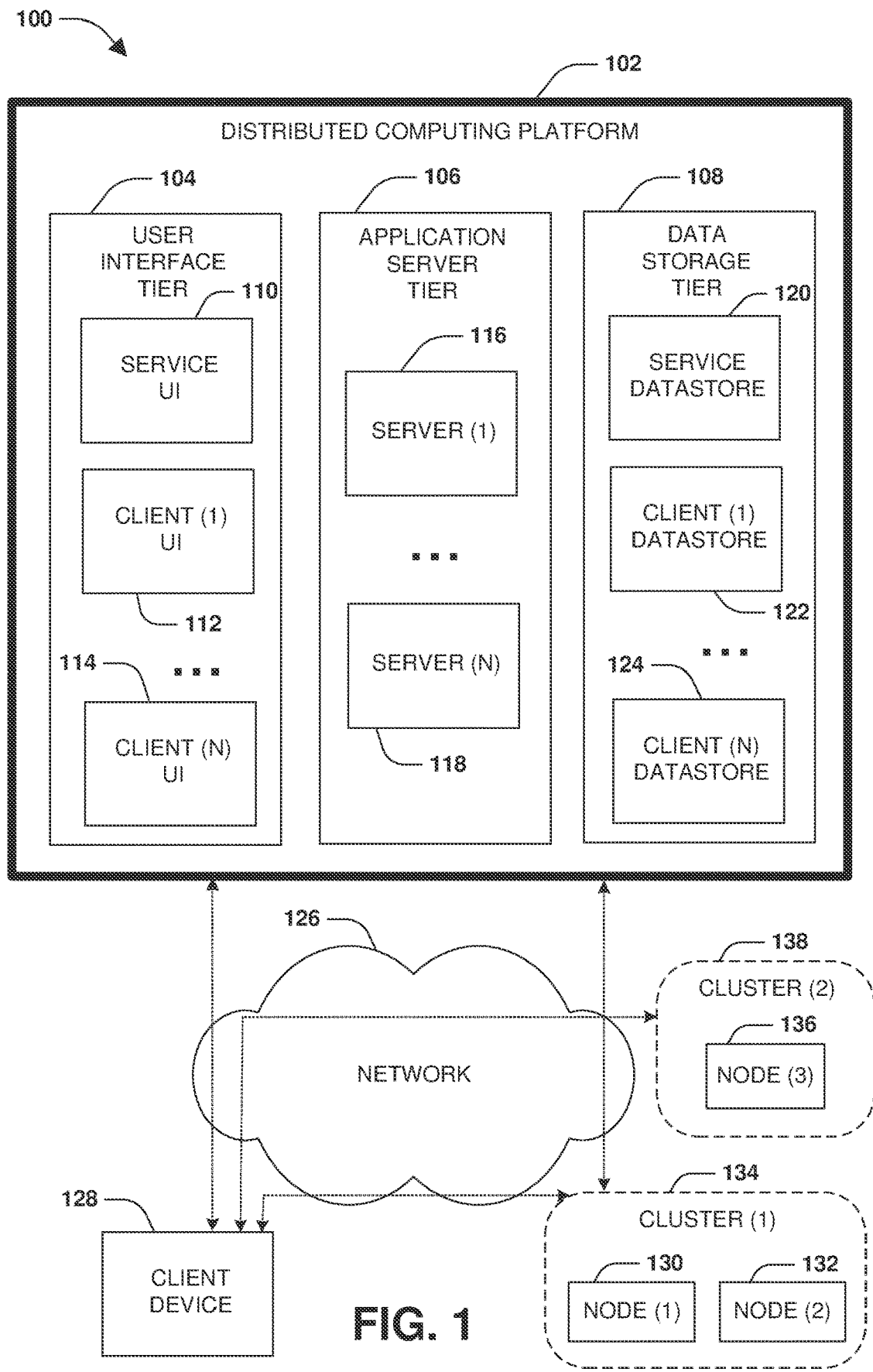
FIG. 1 is a block diagram illustrating an example computing environment in which an embodiment of the invention may be implemented.

The techniques described herein are directed to coordinating snapshot operations across multiple file systems. A node may expose a single frontend file system to clients for storing and accessing data, such as where the node exposes a volume, an aggregate, etc. On the backend, data of the frontend file system may be stored across multiple backend file systems, such as a persistent memory file system and a storage file system.

For example, the node may comprise a persistent memory tier configured to store data of the frontend file system within persistent memory through the persistent memory file system. The node may comprise a file system tier configured to store data of the frontend file system within storage through a storage file system. The persistent memory may provide relatively lower latency compared to the storage of the file system tier. Thus, certain data, of the frontend file system, may be copied (tiered) from the storage of the storage file system into the persistent memory in order to provide client devices with faster access to the copied data through the persistent memory file system.

The original data may still be maintained within the storage of the storage file system. As modify operations are executed upon the persistent memory to change the data within the persistent memory, the data within the persistent memory may diverge from the original data within the storage of the storage file system. In this way, some of the latest data of the frontend file system may be stored within the persistent memory (e.g., data within tiered data blocks that have been copied into the persistent memory and are tracked by the persistent memory file system), and some of the latest data of the frontend file system may be stored within the storage of the storage file system (e.g., non-tiered data blocks that have not been tiered into the persistent memory and are tracked by the storage file system).

Because two instances of the tiered data of the frontend file system may be stored across both the storage of the storage file system and the persistent memory, an original instance of the tiered data within the storage of the storage file system may become stale/old. The original instance of the tiered data may become stale because newer data may have been written to the tiered instance of the tiered data within the persistent memory. To prevent stale data from being provided to clients or operated upon, the node (e.g., file systems, operating systems, and services of the node) may be configured to consider data within the persistent memory as being the authoritative copy for any data blocks that have been tiered to the persistent memory and are tracked by the persistent memory file system. This configuration is referred to as an invariant that is implemented so that client operations can be executed upon the persistent memory comprising the authoritative copy of data so that clients are not accessing stale/old data. Processing the client operations using the persistent memory reduces the latency associated with processing the client operations due to the lower latency characteristics of the persistent memory.

Performing snapshot operations for the frontend file system is challenging and complex because data is stored across both persistent memory and storage of the storage operating system. This is because of the use of multiple file systems across different memory tiers. For example, some of the latest data may be stored through the persistent memory file system (e.g., data within tiered data blocks in the persistent memory), some of the latest data may also be stored through the storage file system (e.g., data within non-tiered data blocks in the storage of the storage file system), and some stale data may be stored through the storage file system (e.g., data within data blocks in the storage of the storage file system that have been tiered into the persistent memory and subsequently overwritten within the persistent memory with newer data).

Traditional snapshot operation functionality is unable to create, delete, and/or restore snapshots across multiple file systems, and are merely configured to operate upon a single file system. Thus, nodes that implement a frontend file system backed by multiple backend file systems cannot benefit from snapshot functionality that would otherwise be able to provide backup and restore functionality for client data.

Accordingly, as provided herein, snapshot creation, deletion, and restoration is coordinated across multiple file systems of a node in order to provide backup and restore functionality for client data stored by the node on behalf of client devices. In order to enable this snapshot functionality across multiple file systems, some embodiments use a forwarding mechanism for operations to bypass the persistent memory tier and a framing mechanism to notify the storage file system of more up-to-date data within the persistent memory. These two mechanisms are implemented so that the storage file system becomes aware of the location of the more up-to-date data within the persistent memory so that backup and restore functionality can be implemented by the storage file system upon the latest data within the persistent memory and the storage of the storage file system.

The forwarding mechanism is configured to selectively forward certain operations, such as write operations or operations targeting particular files or objects, received by the persistent memory tier to the file system tier. The forwarded operations are then executed through the storage file system upon the storage of the storage file system. As a result, these forwarded operations bypass being executed through the persistent memory file system. Without this forwarding mechanism, the operations would be received by the persistent memory tier, and would be executed through the persistent memory file system upon the persistent memory, thus creating more up-to-date data within the persistent memory that would need to be communicated to the storage file system.

In some embodiments of forwarding, a modify operation, targeting an object, is received by the persistent memory tier. The modify operation is compared to a forwarding policy to determine whether forwarding is enabled for the modify operation and the object. If forwarding is not enabled by the forwarding policy, then the modify operation is executed upon the persistent memory through the persistent memory file system. If forwarding is enabled by the forwarding policy, then the modify operation is forwarded to the file system tier as a forwarded operation that bypasses the persistent memory file system.

The forwarding policy may enable forwarding for a particular type of operation, for a particular object, for a particular time duration, and/or until occurrence of an event such as until a snapshot operation or a framing operation has completed. The forwarded operation can be executed through the storage file system upon the storage to write new data to an instance of the object maintained within the storage. Because the instance of the object within the storage now comprises the most up-to-date data of the object, the now stale data within a corresponding instance of the object within the persistent memory is deleted. This preserves the invariant that if the persistent memory file system is tracking and storing data of a data block in the persistent memory, then that instance of the data block is the authoritative instance of the data block compared to a corresponding data block within the storage. In this case, the data block of the persistent memory file system is not the authoritative instance of the data block because the corresponding data block of the storage file system now comprises the most up-to-date data (due to the forwarding of certain operations), and thus the data block is removed from the persistent memory. Removing the data block from the persistent memory preserves the invariant that data within the persistent memory is the authoritative copy.

Forwarding is performed by the forwarding mechanism in order to prevent a backlog, of new data within the persistent memory whose existence has not yet been conveyed to the storage file system, from growing. That is, in order for the storage file system to perform a snapshot operation, the storage file system must know where to locate the most up-to-date data of an object upon which the snapshot operation is being implemented.

Without framing used to notify the storage operating system of more up-to-date data within the persistent memory, new incoming modify operations would be executed through the persistent memory file system to write new data into the persistent memory without the knowledge of the storage file system. Thus, framing is performed so that the modify operations bypass the persistent memory file system and are forwarded to the storage file system for execution upon the storage of the storage file system. In this way, the storage file system will have knowledge of the location of the new data within the storage managed by the storage file system.

In order to notify the storage file system of data blocks within the persistent memory that comprise more up-to-date data than corresponding blocks within the storage, framing is performed by the framing mechanism. The framing mechanism scans the blocks of the persistent memory to identify blocks comprising more up-to-date data than corresponding blocks within the storage of the storage file system.

In some embodiments, the framing mechanism may compare timestamps of data within the blocks of the persistent memory to a timestamp of when framing was last performed. If a timestamp of data within a block of the persistent memory is newer than the timestamp of when framing was last performed, then the block comprises more up-to-date data than a corresponding block within the storage of the storage file system. In some embodiments, the framing mechanism may identify the blocks comprising the more up-to-date data based upon an indicator such as a flag being set for the blocks to indicate that the blocks comprise new data not yet framed by the framing mechanism to the storage file system.

For example, when a modify operation is executed by the persistent memory file system upon the persistent memory to write new data to a block within the persistent memory, the indicator may be set to indicate that the block comprises new data not yet framed by the framing mechanism. Once the new data within the block is framed (e.g., the framing mechanism provides the storage file system with a file block number of the block comprising more up-to-date data than a corresponding block in the storage), the framing mechanism may modify the indicator, such as by clearing the flag. In this way, the framing mechanism identifies blocks within the persistent memory comprising more up-to-date data than corresponding blocks within the storage, and transmits framing operations to the storage file system. The framing operations comprises file block numbers of these blocks within the persistent memory so that the storage file system has knowledge of how to access the more up-to-date data.

Once the framing has completed, the storage file system has a comprehensive view of where the latest data of the frontend file system resides across the persistent memory and the storage of the storage file system. The storage file system is able to implement various types of snapshot operations, such as snapshot create operations, snapshot delete operations, snapshot restore operations, etc. because the storage file system is now able to identify where the latest versions of data targeted by a snapshot operation reside across the persistent memory of the persistent memory file system and the storage of the storage file system.

Various embodiments of the present technology provide for a wide range of technical effects, advantages, and/or improvements to computing systems and components. For example, various embodiments may include one or more of the following technical effects, advantages, and/or improvements: 1) the ability to implement a frontend file system that has data stored across multiple backend file systems storing data within diverse types of storage such as block-addressable storage and byte-addressable storage; 2) the ability to notify a storage file system of more up-to-date data maintained by a persistent memory file system by utilizing a framing mechanism; 3) the ability to stop a framing backlog from increasing by implementing a forwarding mechanism to forward operations to the storage file system and bypass the persistent memory file system so that the operations do not increase the amount of new data within the persistent memory to frame; and 4) the ability to implement various types of snapshot operations across multiple file systems in order to provide backup and restore functionality for data stored across the multiple file systems.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other file system metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain file system operations needed to deduplicate a block, duplicate records in the dup file are sorted in certain file system sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
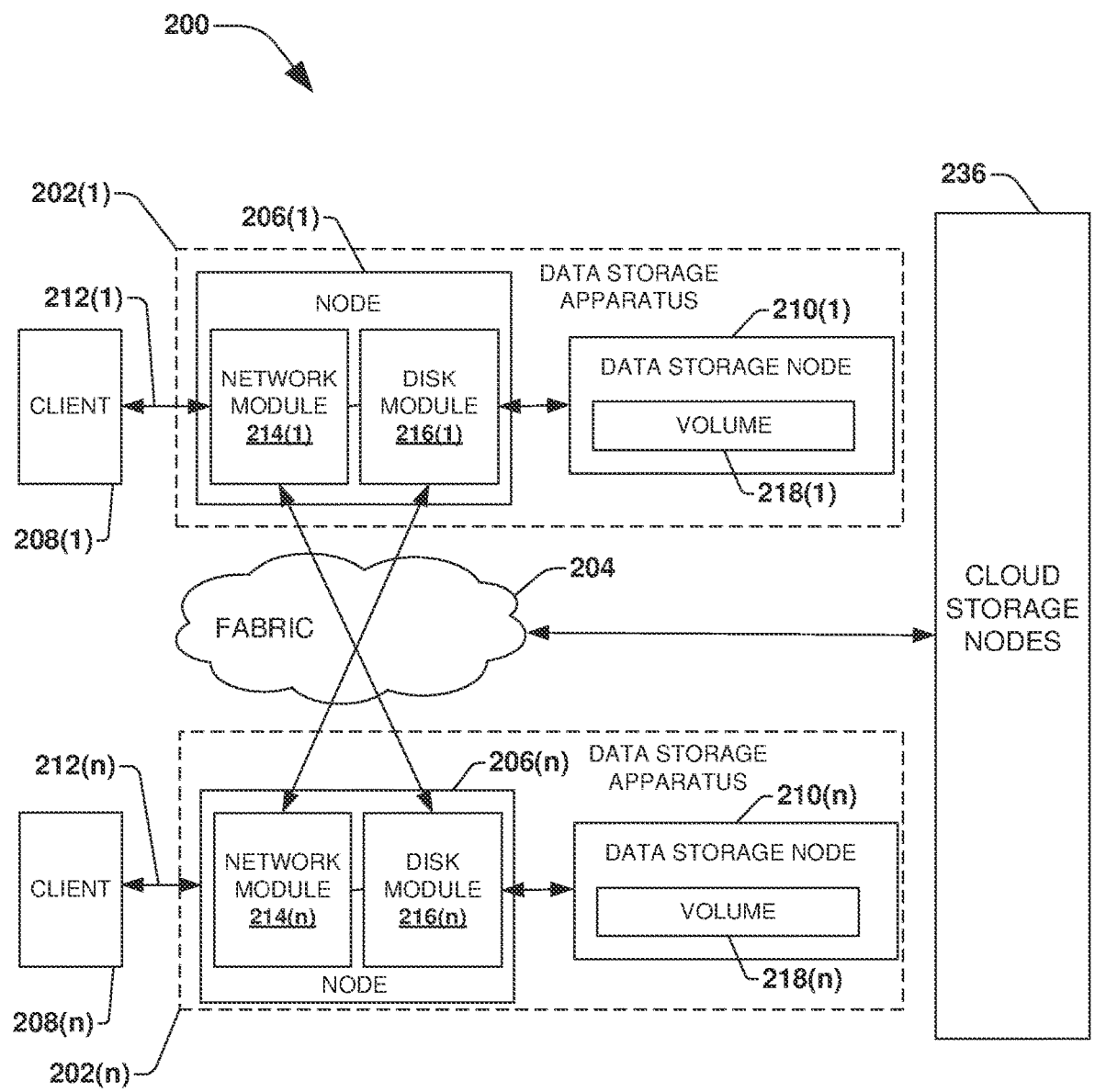
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more file systems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
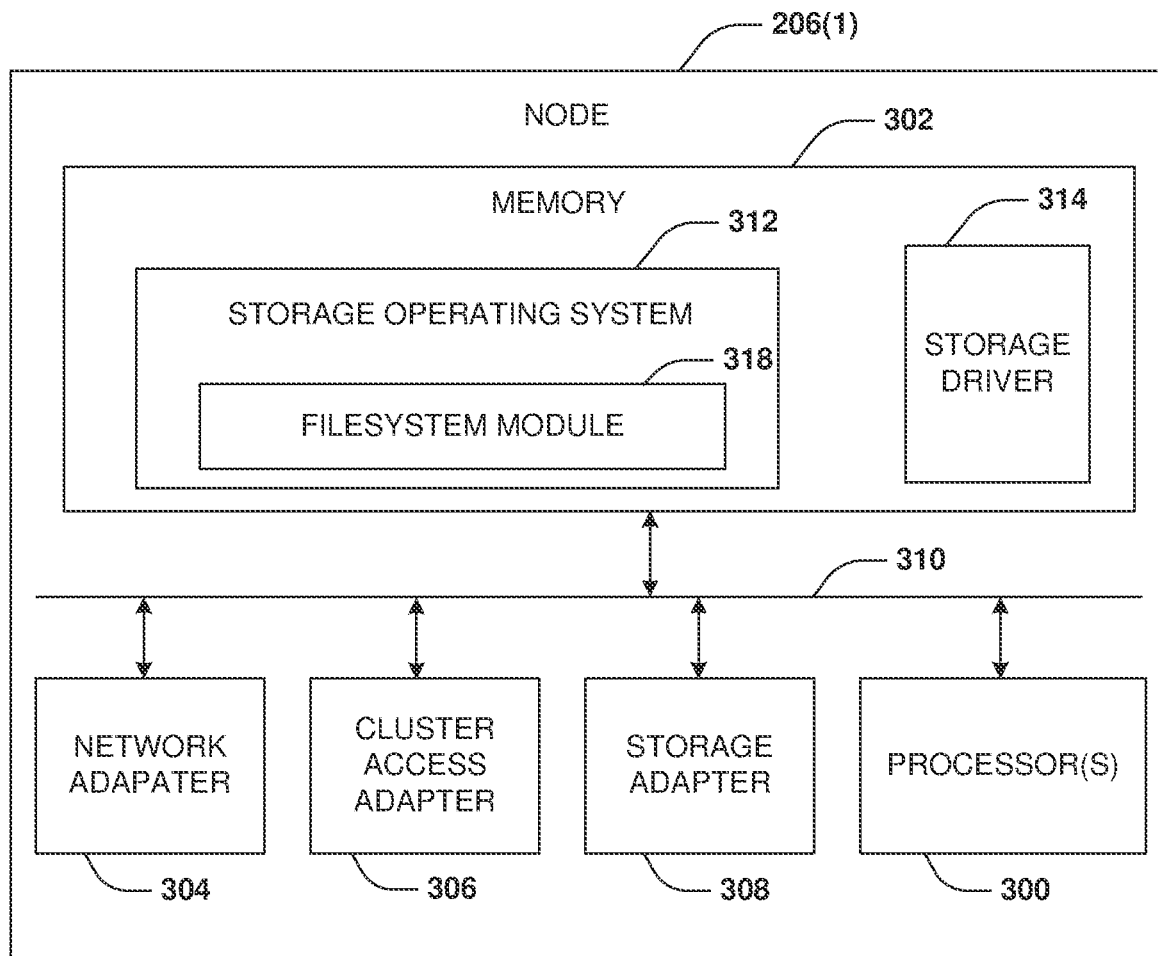
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more file systems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a file system.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
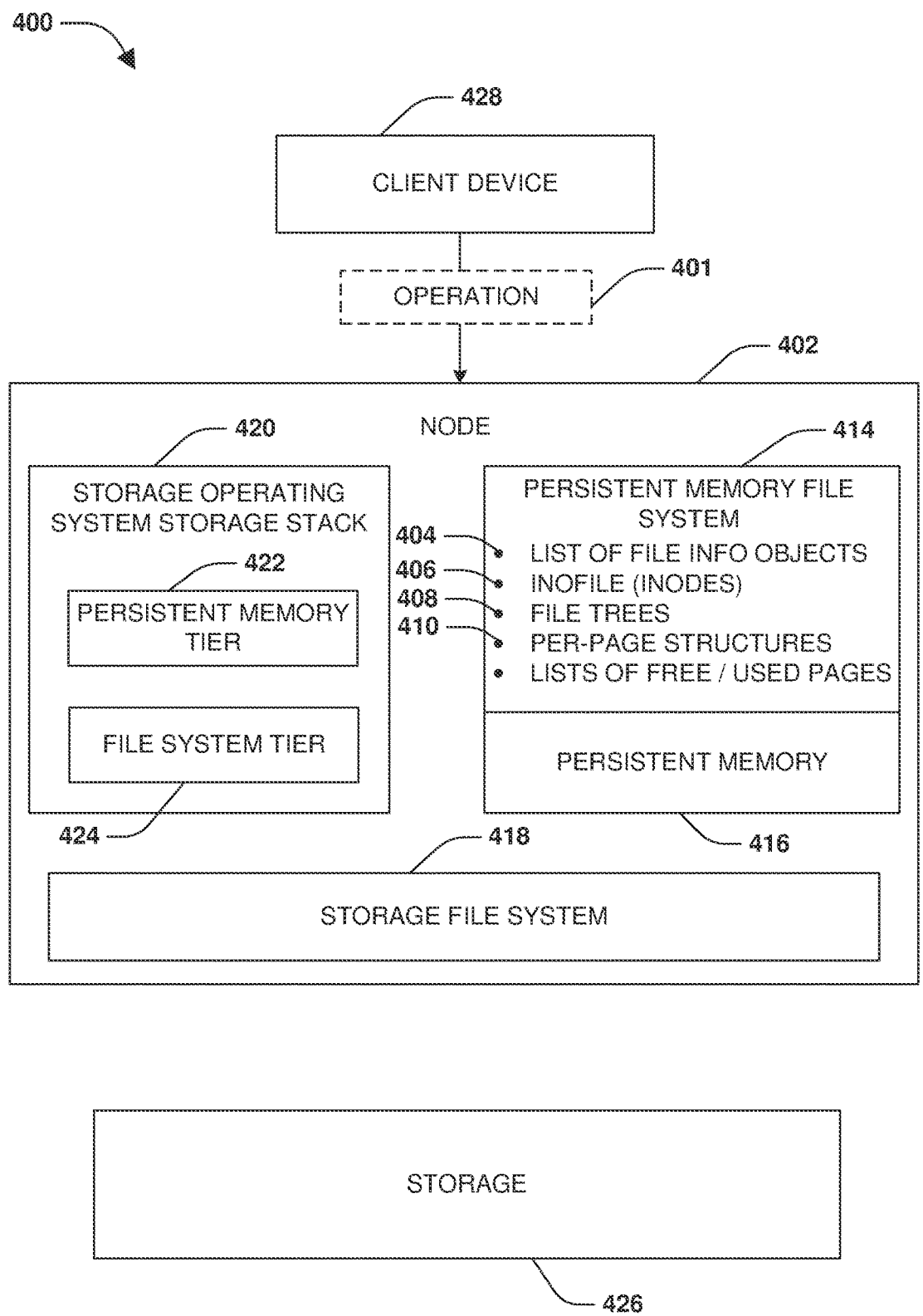
FIG. 4 is a block diagram illustrating an example of various components of system for implementing a persistent memory tier and a file system tier in accordance with an embodiment of the invention.

FIG. 4 illustrates a system 400 comprising node 402 that implements a file system tier 424 to manage storage 426 and a persistent memory tier 422 to manage persistent memory 416 of the node 402. The node 402 may comprise a server, an on-premise device, a virtual machine, computing resources of a cloud computing environment (e.g., a virtual machine hosted within the cloud), a computing device, hardware, software, or combination thereof. The node 402 may be configured to manage the storage and access of data on behalf of clients, such as a client device 428. The node 402 may host a storage operating system configured to store and manage data within and/or across various types of storage devices, such as locally attached storage, cloud storage, disk storage, flash storage, solid state drives, tape, hard disk drives, etc. For example, the storage operating system of the node 402 may store data within storage 426, which may be composed of one or more types of block-addressable storage (e.g., disk drive, a solid-state drive, etc.) or other types of storage. The data may be stored within storage objects, such as volumes, containers, logical unit numbers (LUNs), aggregates, cloud storage objects, etc. In an embodiment, an aggregate or other storage object may be comprised of physical storage of a single storage device or storage of multiple storage devices or storage providers.

The storage operating system of the node 402 may implement a storage file system 418 that manages the storage and client access of data within the storage objects stored within the storage 426 associated with the node 402. For example, the client device 428 may utilize the storage file system 418 in order to create, delete, organize, modify, and/or access files within directories of a volume managed by the storage file system 418. The storage operating system may be associated with a storage operating system storage stack 420 that comprises a plurality of levels through which operations, such as read and write operations from client devices, are processed. An operation may first be processed by a highest-level tier, and then down through lower-level tiers of the storage operating system storage stack 420 until reaching a lowest level tier of the storage operating system storage stack 420. The storage file system 418 may be managed by a file system tier 424 within the storage operating system storage stack 420. When an operation reaches the file system tier 424, the operation may be processed by the storage file system 418 for storage within the storage 426.

The storage file system 418 may be configured with commands, APIs, data structures (e.g., data structures used to identify block address locations of data within the storage 426), and/or other functionality (e.g., functionality to access certain block ranges within the storage 426) that is tailored to the block-addressable storage 426. Because the storage file system 418 is tailored for the block-addressable semantics of the storage 426, the storage file system 418 may be unable to utilize other types of storage that use a different addressing semantics such as persistent memory 416 that is byte-addressable. The persistent memory 416 provides relatively lower latency and faster access speeds than the block-addressable storage 426 that the storage file system 418 is natively tailored to manage. Because the persistent memory 416 is byte-addressable instead of block-addressable, the storage file system 418, data structures of the storage file system 418 used to locate data according to block-addressable semantics of the storage 426, and the commands to store and retrieved data from the block-addressable storage 426 may not be able to be leveraged for the byte-addressable persistent memory 416.

Accordingly, a persistent memory file system 414 and the persistent memory tier 422 for managing the persistent memory file system 414 are implemented for the persistent memory 416 so that the node 402 can use the persistent memory file system 414 to access and manage the persistent memory 416 or other types of byte-addressable storage for storing user data. The persistent memory 416 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc.

The persistent memory 416 is non-volatile memory that has nearly the same speed and latency of DRAM and has the non-volatility of NAND flash. The persistent memory 416 could dramatically increase system performance of the node 402 compared to the higher latency and slower speeds of the block-addressable storage 426 accessible to the node 402 through the storage file system 418 using the file system tier 424 (e.g., hard disk drives, solid state storage, cloud storage, etc.). The persistent memory 416 is byte-addressable, and may be accessed through a memory controller. This provides faster and more fine-grained access to persistent storage within the persistent memory 416 compared to block-based access to the block-addressable storage 426 through the storage file system 418.

The persistent memory file system 414 implemented for the byte-addressable persistent memory 416 is different than the storage file system 418 implemented for the block-addressable storage 426. For example, the persistent memory file system 414 may comprise data structures and/or functionality tailored to byte-addressable semantics of the persistent memory 416 for accessing bytes of storage, which are different than data structures and functionality of the storage file system 418 that are tailored to block-addressable semantics of the storage 426 for accessing blocks of storage. Furthermore, the persistent memory file system 414 is tailored for the relatively faster access speeds and lower latency of the persistent memory 416, which improves the operation of the node 402 by allowing the node 402 to process I/O from client devices much faster using the persistent memory tier 422, the persistent memory file system 414, and the persistent memory 416.

In order to integrate the persistent memory 416 into the node 402 in a manner that allows client data of client devices, such as the client device 428, to be stored into and read from the persistent memory 416, the persistent memory tier 422 is implemented within the storage operating system storage stack 420 for managing the persistent memory 416. The persistent memory tier 422 is maintained at a higher level within the storage operating system storage stack 420 than the file system tier 424 used to manage the storage file system 418. The persistent memory tier 422 is maintained higher in the storage operating system storage stack 420 than the file system tier 424 so that operations received from client devices by the node 402 are processed by the persistent memory tier 422 before the file system tier 424 even though the operations may target the storage file system 418 managed by the file system tier 424. This occurs because higher levels within the storage operation system storage stack 420 process operations before lower levels within the storage operating system storage stack 420.

The persistent memory tier 422 may implement various APIs, functionality, data structures, metadata, and commands for the persistent memory file system 414 to access and/or manage the persistent memory 416. For example, the persistent memory tier 422 may implement APIs to access the persistent memory file system 414 of the persistent memory 416 for storing data into and/or retrieving data from the persistent memory 416 according to byte-addressable semantics of the persistent memory 416. The persistent memory tier 422 may implement functionality to determine when data should be tiered out from the persistent memory 416 to the storage 426 based upon the data becoming infrequently accessed, and thus cold.

The persistent memory file system 414 is configured with data structures and/or metadata for tracking and locating data within the persistent memory 416 according to the byte-addressable semantics. For example, the persistent memory file system 414 indexes the persistent memory 416 of the node 402 as an array of pages (e.g., 4 kb pages) indexed by page block numbers. One of the pages, such as a page (1), comprises a file system superblock that is a root of a file system tree (a buffer tree) of the persistent memory file system 414. A duplicate copy of the file system superblock may be maintained within another page of the persistent memory 416 (e.g., a last page, a second to last page, a page that is a threshold number of indexed pages away from page (1), etc.). The file system superblock comprises a location of a list of file system info objects 404.

The list of file system info objects 404 comprises a linked list of pages, where each page contains a set of file system info objects. If there are more file system info objects than what can be stored within a page, then additional pages may be used to store the remaining file system info objects and each page will have a location of the next page of file system info objects. In this way, a plurality of file system info objects can be stored within a page of the persistent memory 416. Each file system info object defines a file system instance for a volume and snapshot (e.g., a first file system info object correspond to an active file system of the volume, a second file system info object may correspond to a first snapshot of the volume, a third file system info object may correspond to a second snapshot of the volume, etc.). Each file system info object comprises a location within the persistent memory 416 of an inofile (e.g., a root of a page tree of the inofile) comprising inodes of a file system instance.

An inofile 406 of the file system instance comprises an inode for each file within the file system instance. An inode of a file comprises metadata about the file. Each inode stores a location of a root of a file tree for a given file. In particular, the persistent memory file system 414 maintains file trees 408, where each file is represented by a file tree of indirect pages (intermediate nodes of the file tree) and direct blocks (leaf nodes of the file tree). The direct blocks are located in a bottom level of the file tree, and one or more levels of indirect pages are located above the bottom level of the file tree. The indirect pages of a particular level comprise references to blocks in a next level down within the file tree (e.g., a reference comprising a page block number of a next level down node or a reference comprising a per-page structure ID of a per-page structure having the page block number of the next level down node). Direct blocks are located at a lowest level in the file tree and comprise user data. Thus, a file tree for a file may be traversed by the persistent memory file system 414 using a byte range (e.g., a byte range specified by an I/O operation) mapped to a page index of a page (e.g., a 4 k offset) comprising the data within the file to be accessed.

The persistent memory file system 414 may maintain other data structures and/or metadata used to track and locate data within the persistent memory 416. In an embodiment, the persistent memory file system 414 maintains per-page structures 410. A per-page structure is used to track metadata about each page within the persistent memory 416. Each page will correspond to a single per-page structure that comprises metadata about the page. In an embodiment, the per-page structures are stored in an array within the persistent memory 416. The per-page structures correspond to file system superblock pages, file system info pages, indirect pages of the inofile 406, user data pages within the file trees 408, per-page structure array pages, etc.

In an embodiment of implementing per-page structure to page mappings using a one-to-one mapping, a per-page structure for a page can be fixed at a page block number offset within a per-page structure table. In an embodiment of implementing per-page structure to page mappings using a variable mapping, a per-page structure of a page stores a page block number of the page represented by the per-page structure. With the variable mapping, persistent memory objects (e.g., objects stored within the file system superblock to point to the list of file system info objects; objects within a file system info object to point to the root of the inofile; objects within an inode to point to a root of a file tree of a file; and objects within indirect pages to point to child blocks (child pages)) will store a per-page structure ID of its per-page structure as a location of a child page being pointed to, and will redirect through the per-page structure using the per-page structure ID to identify the physical block number of the child page being pointed to. Thus, an indirect entry of an indirect page will comprise a per-page structure ID that can be used to identify a per-page structure having a physical block number of the page child pointed to by the indirect page.

The persistent memory tier 422 may implement functionality to utilize a policy to determine whether certain operations should be redirected to the persistent memory file system 414 and the persistent memory 416 or to the storage file system 418 and the storage 426 (e.g., if a write operation targets a file that the policy predicts will be accessed again, such as accessed within a threshold timespan or accessed above a certain frequency, then the write operation will be retargeted to the persistent memory 416). For example, the node 402 may receive an operation from the client device 428.

The operation may be processed by the storage operating system using the storage operating system storage stack 420 from a highest level down through lower levels of the storage operating system storage stack 420. Because the persistent memory tier 422 is at a higher level within the storage operating system storage stack 420 than the file system tier 424, the operation is intercepted by the persistent memory tier 422 before reaching the file system tier 424. The operation is intercepted by the persistent memory tier 422 before reaching the file system tier 424 even though the operation may target the storage file system 418 managed by the file system tier 424. This is because the persistent memory tier 422 is higher in the storage operating system storage stack 420 than the file system tier 424, and operations are processed by higher levels before lower levels within the storage operating system storage stack 420.

Accordingly, the operation is intercepted by the persistent memory tier 422 within the storage operating system storage stack 420. The persistent memory tier 422 may determine whether the operation is to be retargeted to the persistent memory file system 414 and the persistent memory 416 or whether the operation is to be transmitted (e.g., released to lower tiers within the storage operating system storage stack 420) by the persistent memory tier 422 to the file system tier 424 for processing by the storage file system 418 utilizing the storage 426. In this way, the tiers within the storage operating system storage stack 420 are used to determine how to route and process operations utilizing the persistent memory 416 and/or the storage 426.

In an embodiment, an operation 401 is received by the node 402. The operation 401 may comprise a file identifier of a file to be accessed. The operation 401 may comprise file system instance information, such as a volume identifier of a volume to be accessed and/or a snapshot identifier of a snapshot of the volume to be accessed. If an active file system of the volume is to be accessed, then the snapshot identifier may be empty, null, missing, comprising a zero value, or otherwise comprising an indicator that no snapshot is to be accessed. The operation 401 may comprise a byte range of the file to be accessed.

The list of file system info objects 404 is evaluated using the file system information to identify a file system info object matching the file system instance information. That is, the file system info object may correspond to an instance of the volume (e.g., the active file system of the volume or a snapshot identified by the snapshot identifier of the volume identified by the volume identifier within the operation 401) being targeted by the operation 401, which is referred to as an instance of a file system or a file system instance. In an embodiment of the list of file system info objects 404, the list of file system info objects 404 is maintained as a linked list of entries. Each entry corresponds to a file system info object, and comprises a volume identifier and a snapshot identifier of the file system info object. In response to the list of file system info objects 404 not comprising any file system info objects that match the file system instance information, the operation 401 is routed to the file system tier 424 for execution by the storage file system 418 upon the block-addressable storage 426 because the file system instance is not tiered into the persistent memory 416. However, if the file system info object matching the file system instance information is found, then the file system info object is evaluated to identify an inofile such as the inofile 406 as comprising inodes representing files of the file system instance targeted by the operation 401.

The inofile 406 is traversed to identify an inode matching the file identifier specified by the operation 401. The inofile 406 may be represented as a page tree having levels of indirect pages (intermediate nodes of the page tree) pointing to blocks within lower levels (e.g., a root points to level 2 indirect pages, the level 2 indirect pages point to level 1 indirect pages, and the level 1 indirect pages point to level 0 direct blocks). The page tree has a bottom level (level 0) of direct blocks (leaf nodes of the page tree) corresponding to the inodes of the file. In this way, the indirect pages within the inofile 406 are traversed down until a direct block corresponding to an inode having the file identifier of the file targeted by the operation 401 is located.

The inode may be utilized by the persistent memory file system 414 to facilitate execution of the operation 401 by the persistent memory tier 422 upon the persistent memory 416 in response to the inode comprising an indicator (e.g., a flag, a bit, etc.) specifying that the file is tiered into the persistent memory 416 of the node 402. If the indicator specifies that the file is not tiered into the persistent memory 416 of the node 402, then the operation 401 is routed to the file system tier 424 for execution by the storage file system 418 upon the block-addressable storage 426.

In an embodiment where the operation 401 is a read operation and the inode comprises an indicator that the file is tiered into the persistent memory 416, the inode is evaluated to identify a pointer to a file tree of the file. The file tree may comprise indirect pages (intermediate nodes of the file tree comprising references to lower nodes within the file tree) and direct blocks (leaf nodes of the file tree comprising user data of the file). The file tree may be traversed down through levels of the indirect pages to a bottom level of direct blocks in order to locate one or more direct blocks corresponding to pages within the persistent memory 416 comprising data to be read by the read operation (e.g., a direct block corresponding to the byte range specified by the operation 401). That is, the file tree may be traversed to identify data within one or more pages of the persistent memory 416 targeted by the read operation. The traversal utilizes the byte range specified by the read operation. The byte range is mapped to a page index of a page (e.g., a 4 kb offset) of the data within the file to be accessed by the read operation. In an embodiment, the file tree is traversed to determine whether the byte range is present within the persistent memory 416. If the byte range is present, then the read operation is executed upon the byte range. If the byte range is not present, then the read operation is routed to the file system tier 424 for execution by the storage file system 418 upon the block-based storage 426 because the byte range to be read is not stored within the persistent memory 416. If a portion of the byte range is present within the persistent memory 416, then the remaining portion of the byte range is retrieved from the storage 426.

In an embodiment where the operation 401 is a write operation, access pattern history of the file (e.g., how frequently and recently the file has been accessed) is evaluated in order to determine whether the execute the write operation upon the persistent memory 416 or to route the write operation to the file system tier 424 for execution by the storage file system 418 upon the block-addressable storage 426. In this way, operations are selectively redirected by the persistent memory tier 422 to the persistent memory file system 414 for execution upon the byte-addressable persistent memory 416 or routed to the file system tier 424 for execution by the storage file system 418 upon the block-addressable storage 426 based upon the access pattern history (e.g., write operations targeting more frequently or recently accessed data/files may be executed against the persistent memory 416).

Figure 5:
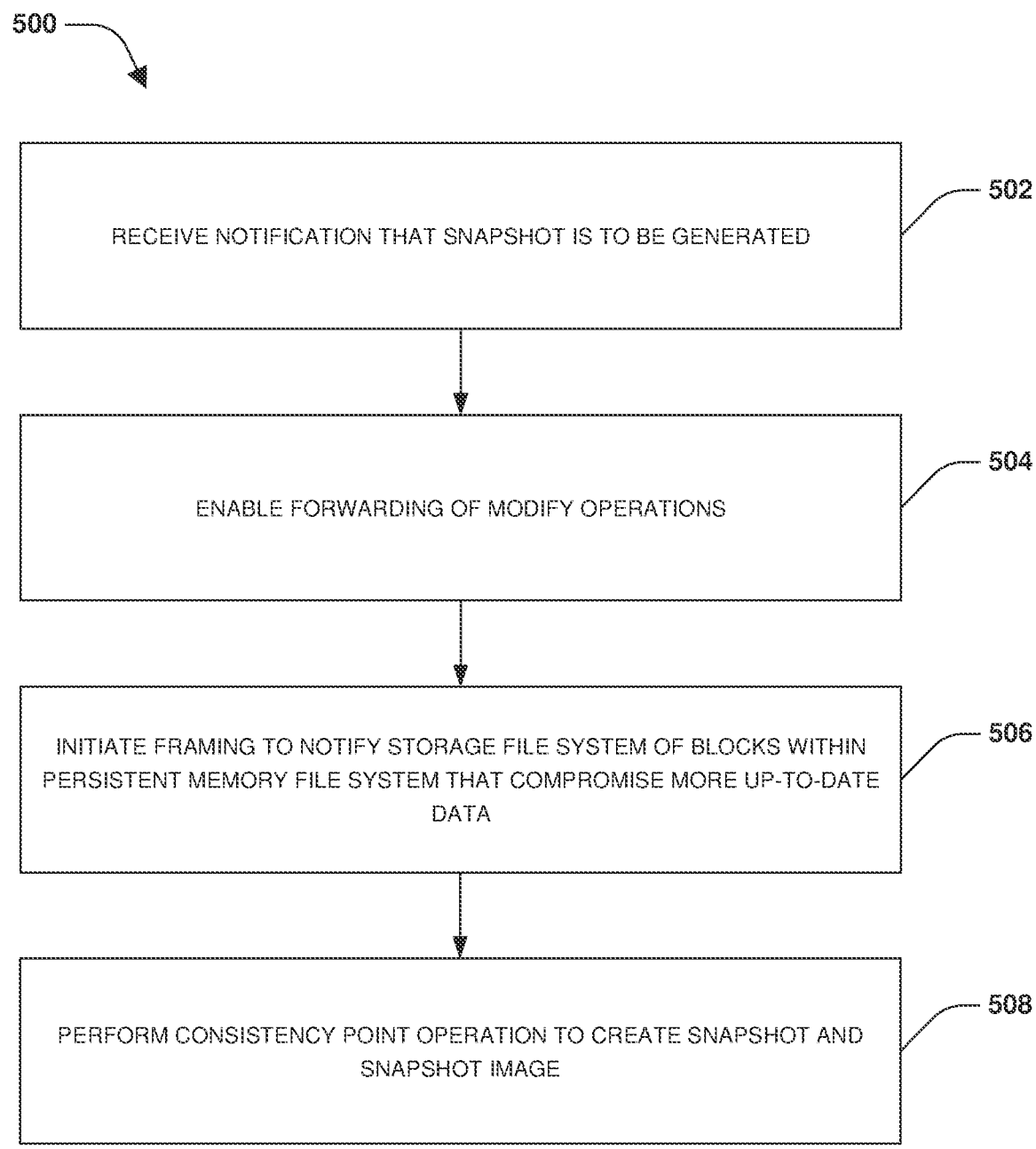
FIG. 5 is a flow chart illustrating an example of a set of operations that support coordinating snapshot operations across multiple file systems in accordance with an embodiment of the invention.

One embodiment of coordinating snapshot operations across multiple file systems is illustrated by an exemplary method 500 of FIG. 5 and further described in conjunction with system 600 of FIGS. 6A-6D. The node 602 may comprise a persistent memory tier 608 associated with persistent memory 606 of the node 602 and a file system tier 610 associated with storage 614 managed by the node 602, similar to node 402 of FIG. 4. The node 602 may implement a persistent memory file system 604 used to store, organize, and provide access to data within the persistent memory 606. The node 602 may implement a storage file system 612 to store, organize, and provide access to data within the storage 614 managed by the node 602.

In some embodiments, the node 602 may expose a single frontend file system of a storage object (e.g., a volume, an aggregate, etc.) to a client. On the backend of the node 602, the data of the frontend file system is stored across the persistent memory 606 through the persistent memory file system 604 and the storage 614 through the storage file system 612. For example, the node 602 may expose a volume to a client device. Data blocks within the storage 614 of the storage file system 612 may be allocated for the volume. At least some corresponding data blocks may be allocated within pages of the persistent memory 606 by the persistent memory file system 604. Some of the data within the storage 614 of the storage file system 612 may be copied (tiered) from data blocks within the storage 614 into corresponding data blocks within the persistent memory 606, and thus two instances of the data are stored across the storage 614 by the storage file system 612 and the persistent memory 606 by the persistent memory file system 604. Because the persistent memory 606 provides lower latency than the storage 614 of the storage file system 612, operations targeting the frontend file system, such as the volume, may be intercepted by the persistent memory tier 608 before reaching the file system tier 610. Instead of these operations being implemented by the storage file system 612 upon the storage 614, the operations may be implemented by the persistent memory file system 604 upon the persistent memory 606 so that client experienced latency is reduced.

As operations are executed by the persistent memory file system 604 upon the persistent memory 606, data within blocks of the persistent memory 606 may diverge from data within corresponding blocks of the storage 614 of the storage file system 612. Because these operations are executed upon the persistent memory 606 by the persistent memory file system 604 and are not executed by the storage file system 612 upon the storage 614, an invariant may be imposed. The invariant may specify that the authoritative copy of data is to be maintained within the persistent memory 606 by the persistent memory file system 604 for blocks that have been tiered into the persistent memory 606 and are tracked by the persistent memory file system 604 (e.g., not all blocks are tiered into the persistent memory 606, and thus the authoritative copy of these blocks are in the storage 614 and tracked by the storage file system 612).

When operations, such as modify operations, are executed through the persistent memory file system 604 to write new data to blocks within the persistent memory 606, the storage file system 612 is unaware of the new data that now makes corresponding blocks within the storage 614 comprise stale data. Thus, the storage file system 612 would be unable to implement snapshot operations because the storage file system 612 is unaware of the fact that new data of an object targeted by a snapshot operation is stored within the persistent memory 606. Accordingly, as provided herein, a framing mechanism and a forwarding mechanism are implemented in order to make the storage file system 612 aware of the more up-to-date data and locations such as file block numbers of blocks within the persistent memory 606 comprising the more up-to-date data so that the storage file system 612 may implement the storage operations on the more up-to-date data as opposed to stale data within the storage 614.

Figure 6A:
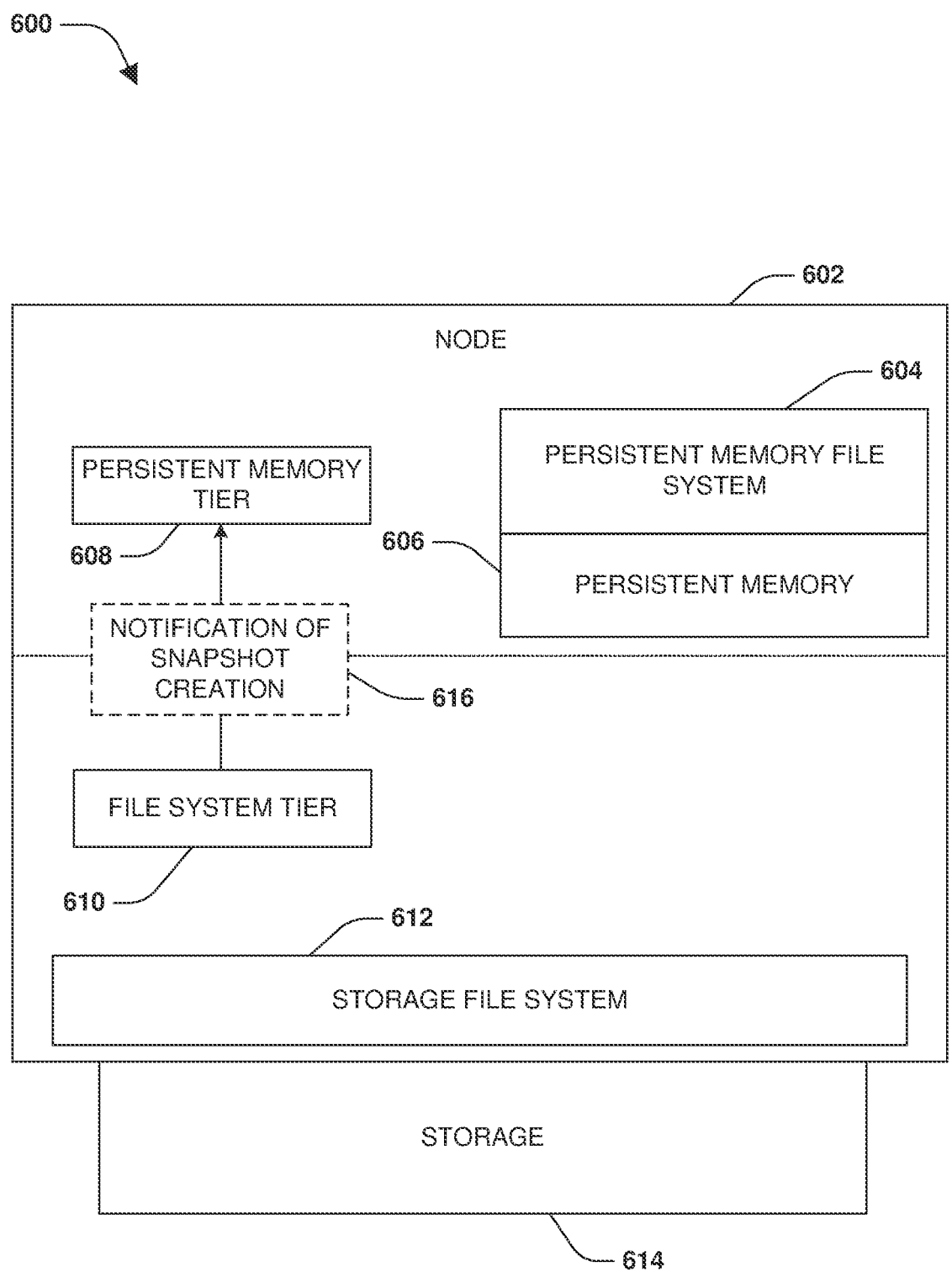
FIG. 6A is a block diagram illustrating an example of supporting the coordination of snapshot operations across multiple file systems in accordance with an embodiment of the invention.

During operation 502 of method 500 of FIG. 5, the persistent memory tier 608 may receive a notification 616 from the file system tier 610 that the storage file system 612 is implementing snapshot creation functionality to generate a snapshot associated with the frontend file system whose data is stored across the persistent memory file system 604 and the storage file system 612, as illustrated by FIG. 6A. For example, a client device may transmit a snapshot creation request to the node 602 for creating a snapshot of the volume (the frontend file system) using snapshot functionality hosted by the file system tier 610. In another example, a backup policy for the volume may specify that the snapshot of the volume is to be created using the snapshot functionality hosted by the file system tier 610. In this way, the file system tier 610 may receive a snapshot creation request, such as from the client or due to the backup policy, to create the snapshot. Accordingly, the file system tier 610 may transmit the notification 616 to the persistent memory tier 608 that the snapshot is to be created. In some embodiments, the file system tier 610 may be configured to fail any subsequently received snapshot requests until the snapshot is created.

Figure 6B:
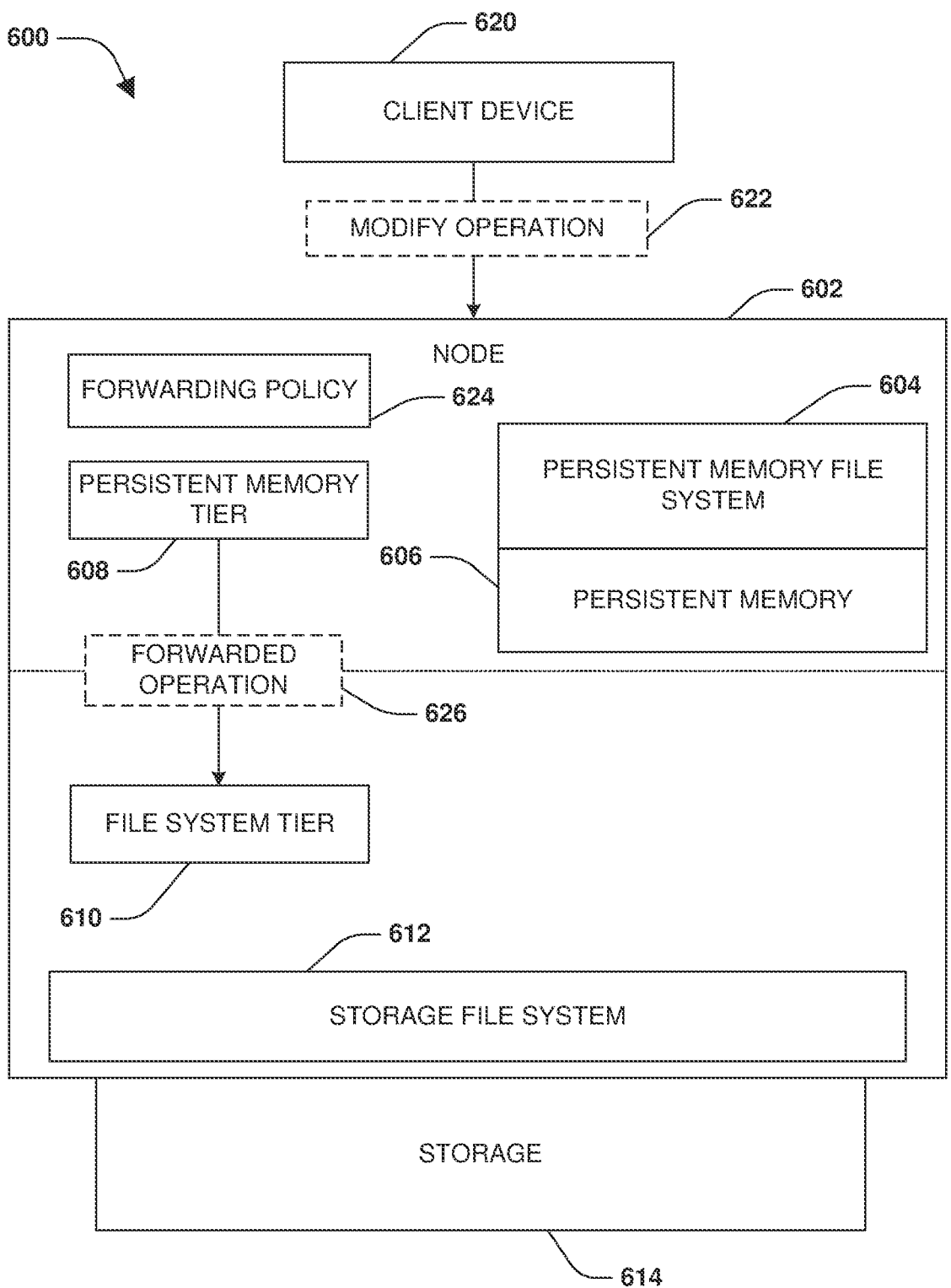
FIG. 6B is a block diagram illustrating an example of supporting the coordination of snapshot operations across multiple file systems in accordance with an embodiment of the invention.

During operation 504 of method 500 of FIG. 5, the persistent memory tier 608 may enable forwarding of modify operations to bypass the persistent memory file system 604, as illustrated by FIG. 6B. In some embodiments, the persistent memory tier 608 may generate a forwarding policy 624 based upon the notification 616 received from the file system tier 610. The forwarding policy 624 may specify that modify operations received by the persistent memory tier 608 and targeting the volume for which the snapshot is to be created are to be forwarded to the file system 610 as forwarded operations for execution through the storage file system 612 and are to bypass execution through the persistent memory file system 604. The forwarding policy 624 may be defined with a forwarding duration window indicating that the forwarding policy 624 is to be enforced until the snapshot has been created.

In an example, the node 602 may receive a modify operation 622 from a client device 620. The modify operation 622 may target a data block within the volume, and is to write new data into the data block. An instance of the data block may be maintained within the persistent memory 606 and a corresponding instance of the data block may be maintained within the storage 614. If forwarding was not enabled, the persistent memory tier 608 would execute the modify operation 622 through the persistent memory file system 604 to write the new data to the block within the persistent memory 606. However, this would increase a framing backlog of new data in the persistent memory 606 that is to be framed to the file system tier 610 so that the snapshot can be created. In this way, forwarding is enabled so that the framing backlog does not keep increasing, thus allowing a framing technique to work through the framing backlog to completion.

As part of forwarding the modify operation 622, the persistent memory tier 608 determines that the forwarding policy 624 enables forwarding for the modify operation 622 and the target object (e.g., the data block of the volume) targeted by the modify operation 622. Accordingly, the persistent memory tier 608 refrains from executing the modify operation 622 through the persistent memory file system 604 upon the persistent memory 606. Instead, the persistent memory tier 608 forwards the modify operation 622 to the file system tier 610 as a forwarded operation 626. The file system tier 610 may log the forwarded operation 626 into a log, such as an NVLog. The file system tier 610 may execute the forwarded operation 626 through the storage file system 612 to write the new data to the corresponding data block within the storage 614, thus leaving the data within the data block in the persistent memory 606 stale. In order to enforce the variant that the authoritative copy of data for data blocks, tiered into the persistent memory 606, is to be maintained within the persistent memory 606, the stale data is deleted from the data block in the persistent memory 606 in response to the forwarded operation 626 being logged into the log. Because the forwarded operation 626 is executed through the storage file system 612 to write the new data to the storage 614 of the storage file system 612, the storage file system 612 is aware of the latest version of the data of the target object being this new data. Thus, the storage file system 612 can subsequently execute the snapshot creation operation to target the new data within the corresponding data block in the storage 614.

In some embodiments, the node 602 may perform a remote direct access memory transfer to notify a partner node that the new data has been written into the storage 614 and/or to notify the partner node that the stale data is being removed from the persistent memory 606. In this way, the partner node, which may maintain a mirrored copy of the content in the persistent memory of the node 602 within its own partner persistent memory of the partner node, may make corresponding modifications to the partner persistent memory. In this way, the partner persistent memory of the partner node may mirror the persistent memory of the node 602 so that if the node 602 fails, then the partner node can takeover processing client operations in place of the failed node 602 using the mirrored data within the partner persistent memory of the partner node.

Figure 6C:
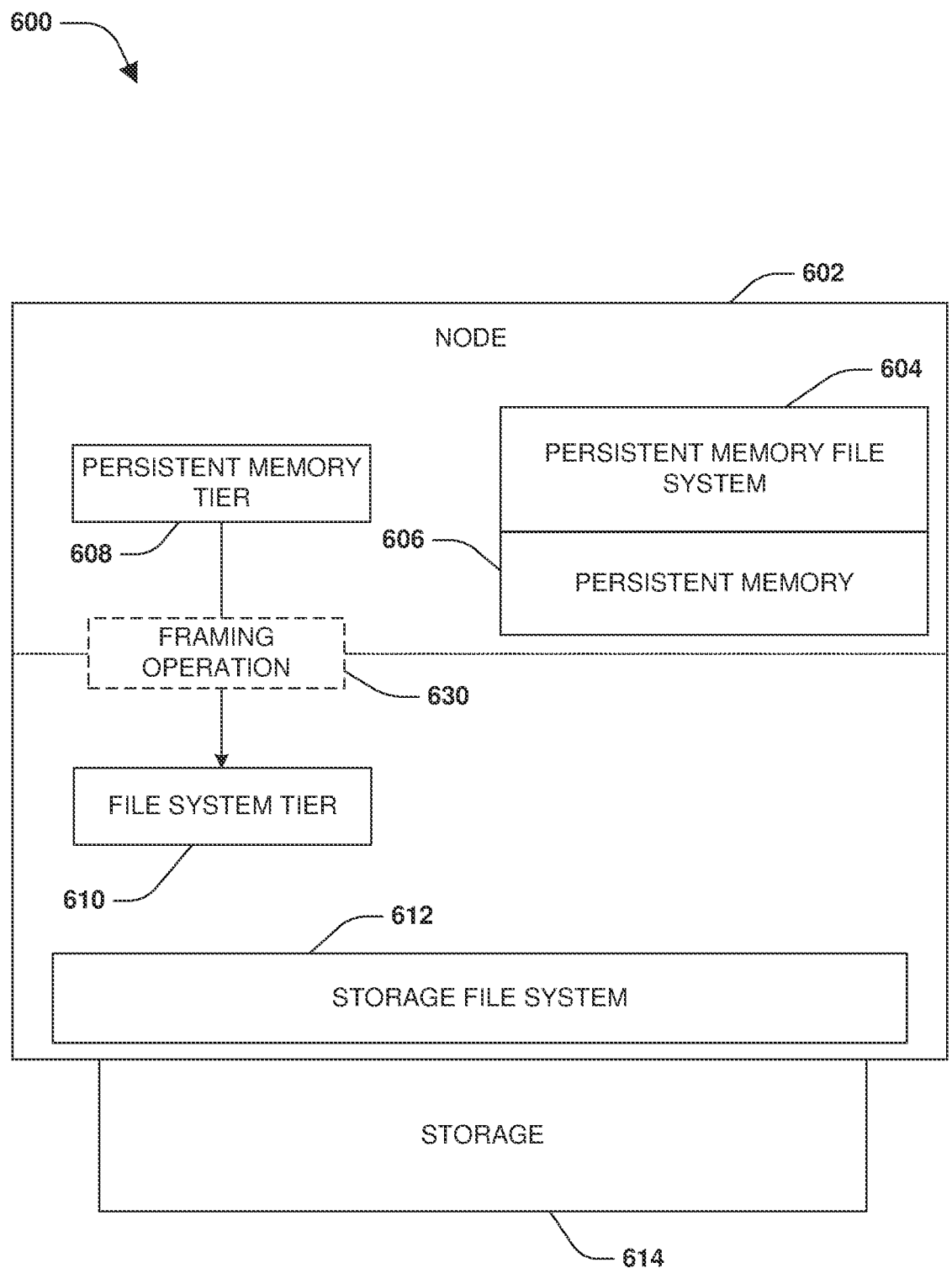
FIG. 6C is a block diagram illustrating an example of supporting the coordination of snapshot operations across multiple file systems in accordance with an embodiment of the invention.

During operation 506 of method 500 of FIG. 5, framing may be initiated by the persistent memory tier 608, as illustrated by FIG. 6C. The framing is performed to notify the storage file system 612 and/or the file system tier 610 of blocks stored in the persistent memory 606 and managed by the persistent memory file system 604 because these blocks comprise more up-to-date data than corresponding blocks stored within the storage 614. During framing, a block within the persistent memory 606 may be identified as having more up-to-date data than a corresponding block in the storage 614 such as where an indicator was set, when the persistent memory file system 604 executed a modify operation to write new data to the block, in order to indicate that the block has the new data that has not yet been framed to the file system tier 610. Accordingly, a file block number of the block in the persistent memory 606 may be transmitted in a framing operation 630 from the persistent memory tier 608 to the file system tier 610 so that the storage file system 612 can utilize the file block number to reference and/or retrieve the more up-to-date data such as during execution of the snapshot creation operation. In some embodiments, a timer may be implemented for the framing. If the timer times out before the framing completes, then the framing may be aborted.

Figure 6D:
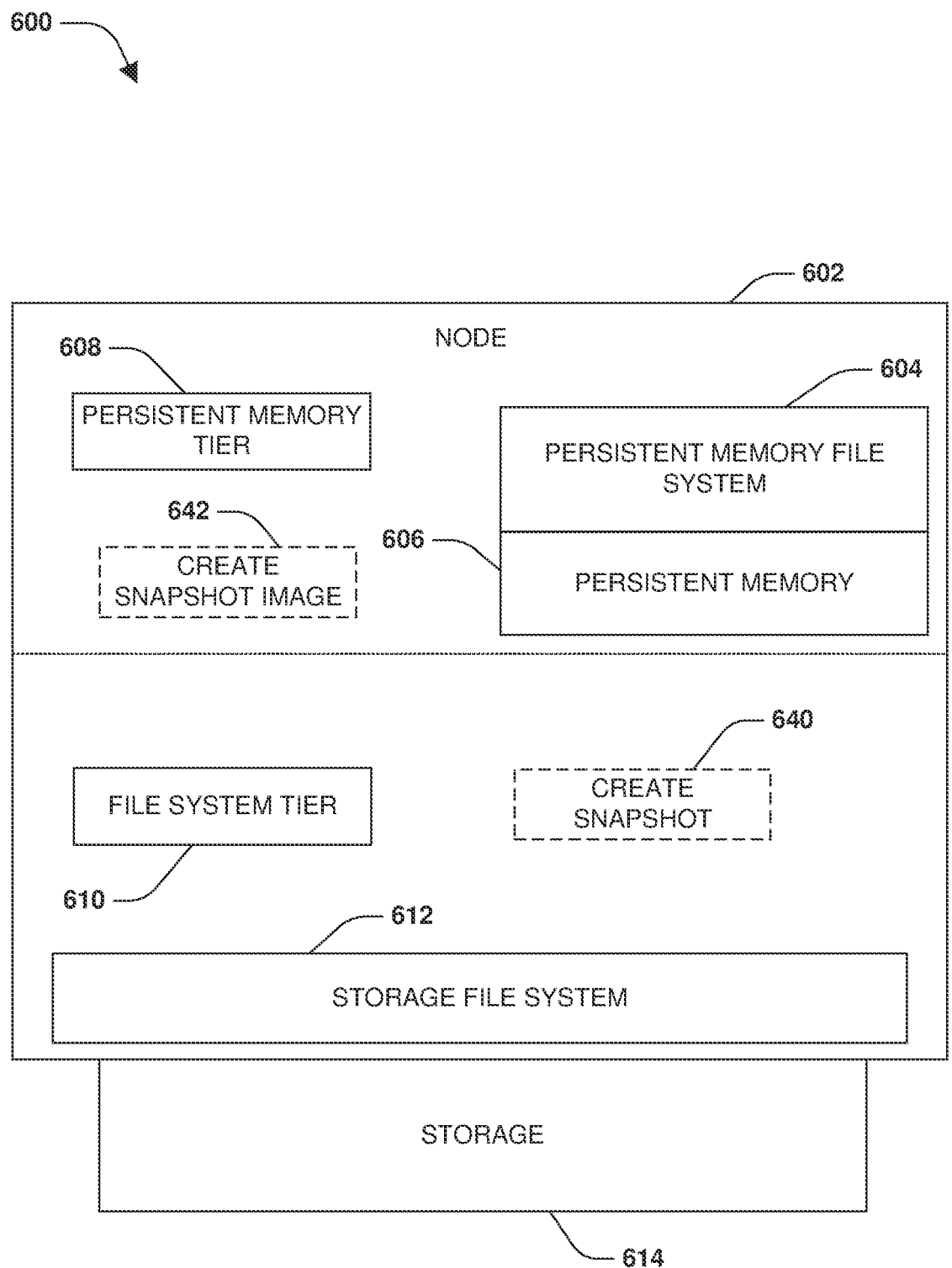
FIG. 6D is a block diagram illustrating an example of supporting the coordination of snapshot operations across multiple file systems in accordance with an embodiment of the invention.

During operation 508 of method 500 of FIG. 5, in response to the framing completing, a consistency point operation for the storage file system 612 is performed to create 640 the snapshot through the storage file system 612 and to create 642 a snapshot image through the persistent memory file system 604 as part of the snapshot, as illustrated by FIG. 6D. When the persistent memory file system 604 creates 642 the snapshot image, a hierarchical reference may be added to the snapshot image. In some embodiments, if there are any remote direct access memory transfers from the persistent memory file system 604 of the node 602 to the partner persistent memory file system of a partner node, then the consistent point operation is suspended until the remote direct access memory transfers are complete and until there are no other pending remote direct access memory transfers. That is, the partner node may maintain, within the partner persistent memory of the partner node, a mirror copy of the data within the persistent memory 606 of the node 602 so that if the node 602 ever fails, then the partner node can take over the processing of operations from client devices in place of the failed node 602 using the mirrored data within the partner persistent memory. Thus, the consistency point operation will wait until all pending remote direct access memory transfers are complete before proceeding so that the persistent memory 606 of the node 602 and the partner persistent memory of the partner node mirror one another and are in-sync.

In some embodiments, a pending operation may be received during the creation 640 of the snapshot and/or the creation 642 of the snapshot image. The pending operation may be atomically implemented to either fully execute against the snapshot such that all operations of the pending operation are included within the snapshot or the pending operation is fully executed against an active file system for which the snapshot is being created such that all operations are part of the active file system and not the snapshot. In this way, the pending operation is restricted from having some operations of the pending operation execute against and being part of the snapshot, while other operations of the pending operation are executed against the active file system and are not part of the snapshot.

In response to the snapshot being created 640 and the snapshot image being created 642 as part of the snapshot, the forwarding of modify operations may be disabled so that incoming modify operations may be executed through the persistent memory file system 604 to the persistent memory 606. For example, the forwarding policy 624 may be removed in order to disable the forwarding of the modify operations.

In some embodiments, an access request such as a read operation may be received by the node 602. The access request may target data that is part of the snapshot and/or the snapshot image. If the access request targets data within the snapshot that is located in the storage 614, then the data is retrieved through the storage file system 612 from the storage 614. If the access request targets data within the snapshot image of the snapshot that is located within the persistent memory 606, then a file block number, which was previously provided to the file system tier 610 by framing, is used to access a block within the persistent memory 606 corresponding to the file block number in order to retrieve the data. In some embodiments, all of the data being requested by the access request may be located within and retrieved from the snapshot within the storage 614. In some embodiments, all of the data being requested by the access request may be located within and retrieved from the snapshot image within the persistent memory 606. In some embodiments, a first portion of the data being requested by the access request may be located within and retrieved from the snapshot within the storage 614 and a second portion of the data being requested by the access request may be located within and retrieved from the snapshot image within the persistent memory 606.

In some embodiments, snapshot creation state information may be maintained to track various states relating to the performance of a snapshot operation. The snapshot creation state information may comprise a first state. In some embodiments, the first state or another state may indicate whether the storage file system 612 has received a snapshot request to create the snapshot. In some embodiments, the first state or another state may indicate whether the persistent memory file system 604 has been notified by the storage file system 612, such as through the notification 616, that the snapshot is to be created. The snapshot creation state information may comprise a second state. In some embodiments, the second state or another state may indicate whether the persistent memory file system 604 has enabled forwarding or not. In some embodiments, the second state or another state may indicate whether the persistent memory file system 604 has initiated framing. In some embodiments, the second state or another state may indicate whether the persistent memory file system 604 has notified the storage file system 612 that framing is complete. The snapshot creation state information may comprise a third state. In some embodiments, the third state or another state indicates whether the consistency point operation has initiated to create 640 the snapshot. In some embodiments, the third state or another state indicates whether the persistent memory file system 604 has been notified to create 642 the snapshot image. In some embodiments, the third state or another state indicates whether the persistent memory file system 604 has disabled forwarding. In some embodiments, the third state or another state indicates whether the consistency point operation has created 640 the snapshot. In this way, the snapshot creation state information may be used to track and control the implementation of snapshot operations. It may be appreciated that the snapshot creation state information may comprise any number of states.

Figure 7:
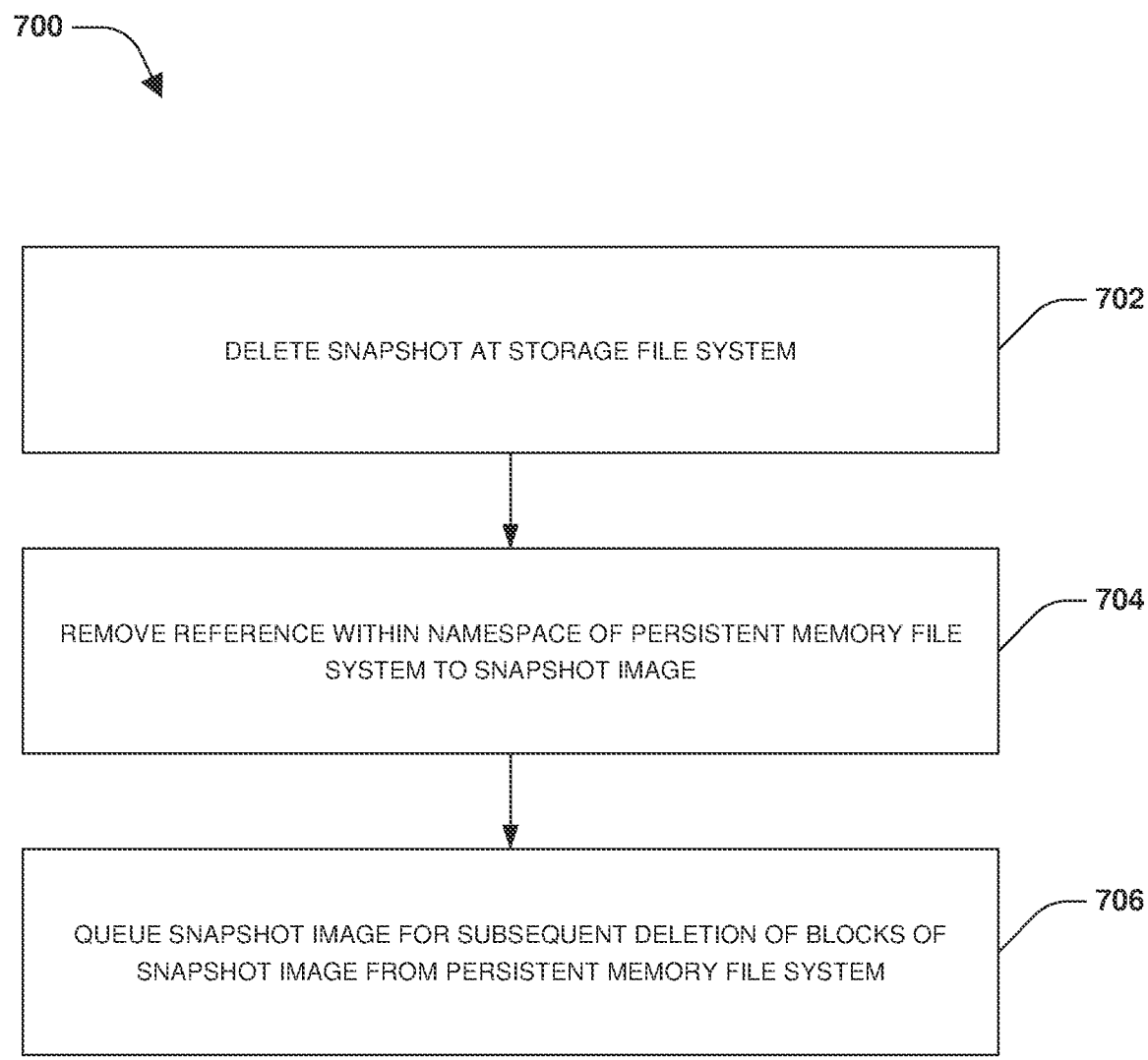
FIG. 7 is a flow chart illustrating an example of a set of operations that support coordinating snapshot operations across multiple file systems in accordance with an embodiment of the invention.

One embodiment of coordinating snapshot operations across multiple file systems is illustrated by an exemplary method 700 of FIG. 7, which is described in relation to the system 600 of FIG. 6D. During operation 702 of method 700 of FIG. 7, the storage file system 612 may receive a snapshot request to delete the snapshot corresponding to data stored across the persistent memory 606 by the persistent memory file system 604 as the snapshot image and data stored across the storage 614 by the storage file system 612 as the snapshot. Accordingly, the storage file system 612 may delete the snapshot from the storage 614 at the storage file system 612.

During operation 704 of method 700 of FIG. 7, in response to the snapshot being deleted at the storage file system 612, a reference, within a namespace of the persistent memory file system 604, to the snapshot image that was part of the snapshot is removed. In this way, the snapshot image is unlinked from the persistent memory file system 604.

During operation 706 of method 700 of FIG. 7, the snapshot image may be queued for subsequent deletion of data blocks of the snapshot image from the persistent memory file system 604 (e.g., deletion of the data within the data blocks in the persistent memory 606 that correspond to the snapshot image) after the reference has been removed from the namespace. This allows the data blocks of the snapshot image to be deleted at a subsequent point in time, such as when additional processing resources are available or during a timeframe when utilization of the node 602 is below a threshold (e.g., lazy deletion of the data blocks).

Client operations may be processed while the snapshot image is queued for subsequent deletion of the data from the data blocks within the persistent memory 606, and thus the deletion of the snapshot image is non-blocking with respect to client I/O. Furthermore, the snapshot request may be acknowledged as complete while the snapshot image is queued for subsequent deletion so that processing of the snapshot request is not unduly delayed. The snapshot request can be acknowledged as complete because the reference to the snapshot has already been removed from the namespace. Subsequent to acknowledging the snapshot request as complete, the persistent memory file system 604 may be traversed to free pages within the persistent memory 606 that comprise the data blocks of data of the snapshot image that is being deleted. In this way, the snapshot request to delete the snapshot may be quickly performed without blocking client I/O, and the freeing of the pages within the persistent memory 606 for storing other data can be lazily performed such as when there is adequate resource availability and/or low utilization of the node 602.

Figure 8:
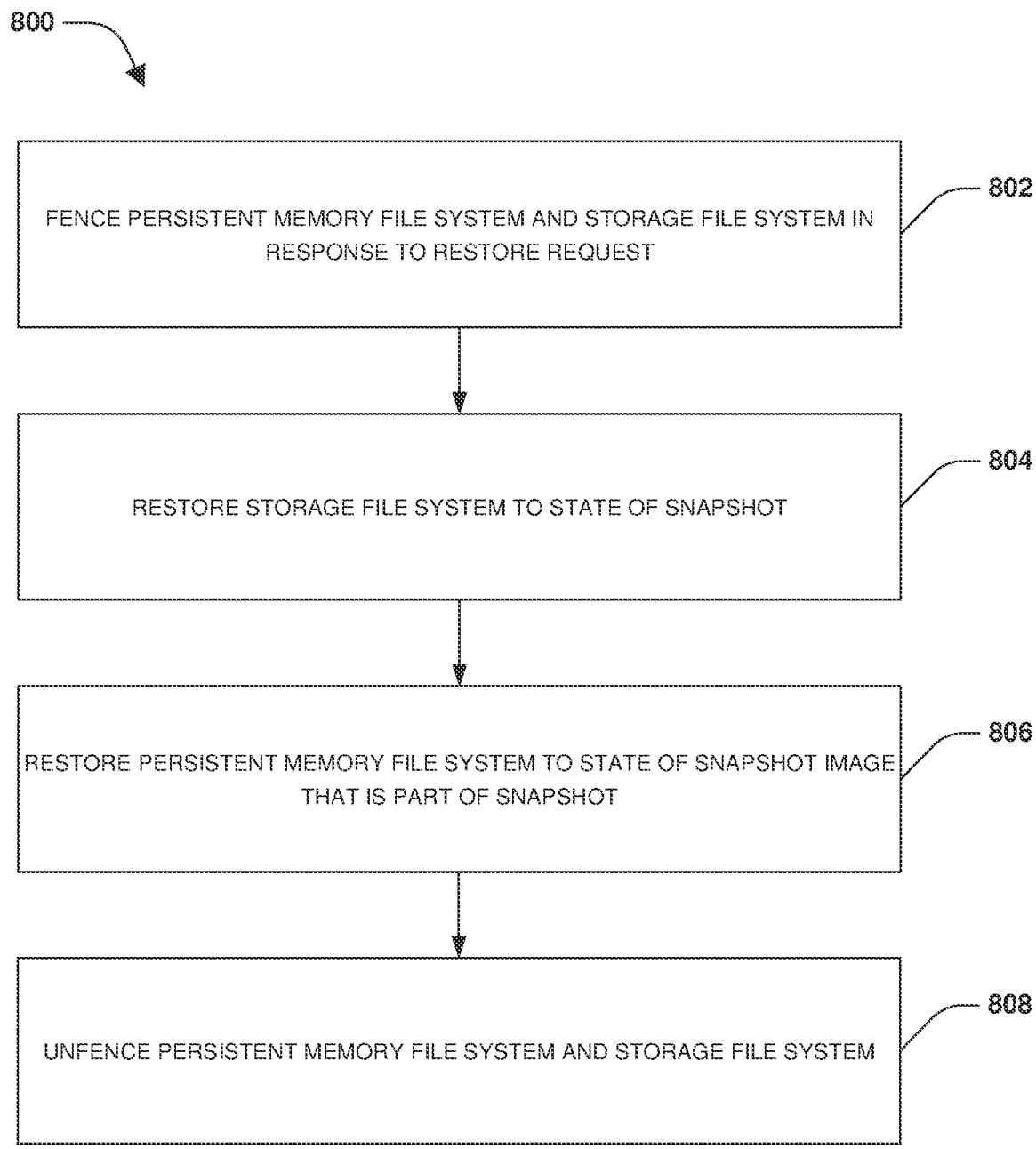
FIG. 8 is a flow chart illustrating an example of a set of operations that support coordinating snapshot operations across multiple file systems in accordance with an embodiment of the invention.

One embodiment of coordinating snapshot operations across multiple file systems is illustrated by an exemplary method 800 of FIG. 8, which is described in relation to the system 600 of FIG. 6D. During operation 802 of method 800 of FIG. 8, a restore request to restore the persistent memory file system 604 and the storage file system 612 of the node 602 (e.g., restore an active file system of the node 602, such as the frontend file system) to a state of the snapshot and snapshot image may be received. Accordingly, a fence may be implemented for the persistent memory file system 604 and the storage file system 612 to block operations directed to the persistent memory file system 604 and the storage file system 612. During operation 804 of method 800 of FIG. 8, once the persistent memory file system 604 and the storage file system 612 are fenced, the storage file system 612 is restored to the state of the snapshot. During operation 806 of method 800 of FIG. 8, the persistent memory file system 604 is restored to a state of the snapshot image that is part of the snapshot. During operation 808 of method 800 of FIG. 8, once the persistent memory file system 604 and the storage file system 612 have been restored to the states of the snapshot and snapshot image, the persistent memory file system 604 and the storage file system 612 are unfenced to allow execution operations directed to the persistent memory file system 604 and the storage file system 612. In some embodiments, a reference count of the snapshot image may be increased so that the active file system associated with the persistent memory file system 604 points to the snapshot image. In this way, the frontend file system is restored to the state of the snapshot and snapshot image.

In some embodiments, the node 602 may experience a failure (e.g., a kernel panic, a crash, etc.) during implementation of the restore request. Accordingly, state information, associated with the implementation of the restore request, may be cleared from the persistent memory file system 604. In an example, a snapshot restore operation of the restore request is implemented and managed by the storage file system 612. The storage file system 612 first performs the snapshot restore operation upon the storage file system 612. After this point, if the storage file system 612 experiences a failure, such as by panicking, before a next consistency point that would persist the snapshot restore operation for the storage file system 612 to persistent storage, then the snapshot restore operation is rejected in the storage file system 612. State information corresponding to various states of implementing the restore request (e.g., states relating to the operations of method 800) may be used to detect that the snapshot restore operation did not completed. This state information, which was tracked within the persistent memory file system 604 during a preparation phase of the snapshot restore operation, may be cleared (e.g., rejected or rolled back). In some embodiments where the restore request was to restore a volume, the state information may be cleared when the volume is mounted after reboot of the node 602 from the failure.

Figure 9:
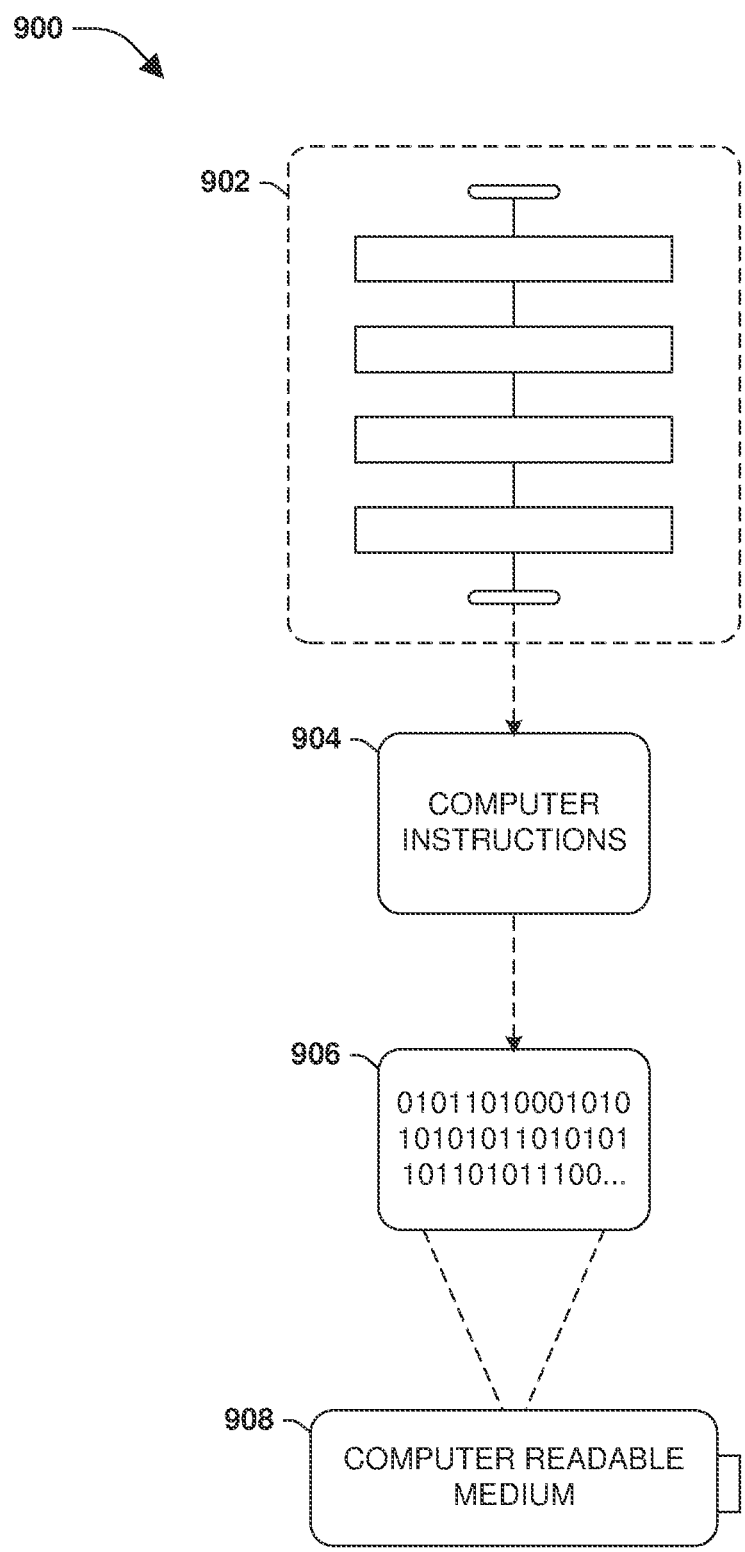
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 500 of FIG. 5, at least some of the exemplary method 700 of FIG. 7, and/or at least some of the exemplary method 800 of FIG. 8, for example. In some embodiments, the processor-executable computer instructions 904 are configured to implement a system, such as at least some of the exemplary system 600 of FIGS. 6A-6D, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   in response to receiving a notification that a snapshot of data stored across a persistent memory file system and a storage file system of a node is to be generated, enabling forwarding of modify operations from received by a persistent memory tier that manages the persistent memory file system, wherein the forwarding includes:
     bypassing execution through the persistent memory file system of an operation received at the persistent memory tier; and
     forwarding, from the persistent memory tier, the operation to a storage file system tier for execution by the storage file system;
   initiating framing to cause the persistent memory file system to notify the storage file system of blocks within the persistent memory file system that comprise more up-to-date data than corresponding blocks within the storage file system; and
   in response to the framing completing, creating the snapshot through the storage file system, wherein the snapshot includes a snapshot image created by the persistent memory file system to include the more up-to-date data, wherein the forwarding is disabled in response to the snapshot being created.

2. The method of claim 1, comprising:
in response to the snapshot being created and the forwarding of the modify operations removing stale data from the persistent memory, disabling the forwarding of incoming modify operations so that the incoming modify operations are executed upon the persistent memory file system.

3. The method of claim 1, comprising:
implementing a timer for a framing process that scans the persistent memory to identify and frame the blocks within the persistent memory file system that comprise the more up-to-date data, wherein the framing process is aborted based upon the timer timing out.

4. The method of claim 1, comprising:
in response to receiving an access request to access first data within the snapshot, retrieving the first data from the storage file system based upon a determination that the first data is stored through the storage file system.

5. The method of claim 4, comprising:
in response to the access request targeting second data within the snapshot, utilizing a file block number, provided to the storage file system by the framing, to access a block within the persistent memory file system comprising the second data.

6. The method of claim 1, comprising:
failing subsequently received snapshot requests until the snapshot is created.

7. The method of claim 1, comprising:
in response to identifying a remote direct access memory transfer from the persistent memory file system of the node to a partner node, suspending a consistency point operation until completion of the remote direct access memory transfer.

8. The method of claim 1, comprising:
maintaining snapshot creation state information comprising a first state indicating at least one of the storage file system has received a snapshot request to create the snapshot or the persistent memory file system has been notified by the storage file system that the snapshot is to be created.

9. The method of claim 8, comprising:
updating the snapshot creation state information to a second state indicating at least one of the persistent memory file system has enabled the forwarding, the persistent memory file system has initiated the framing, or the persistent memory file system has notified the storage file system that the framing is complete.

10. The method of claim 9, comprising:
updating the snapshot creation state information to a third state indicating at least one of a consistency point operation has initiated the creation of the snapshot, the persistent memory file system has been notified to create the snapshot image, the persistent memory file system has disabled the forwarding, or the consistency point operation has created the snapshot.

11. The method of claim 1, comprising:
atomically implementing a pending operation to either fully execute against the snapshot or fully execute against an active file system for which the snapshot is being created, wherein the pending operation is restricted from executing across both the snapshot and the active file system.

12. The method of claim 1, wherein the enabling forwarding comprises:
in response to receiving a modify operation at the persistent memory tier, forwarding the modify operation as a forwarded operation to the storage file system;
logging the forwarded operation into a log of the node;
writing the data of the forwarded operation to a target object within the storage file system; and
in response to the forwarded operation being logged in the log, removing a stale copy of the target object from the persistent memory file system and performing a remote direct access memory transfer to notify a partner node that the stale copy of the target object was removed from the persistent memory file system.

13. The method of claim 1, comprising:
generating, by the persistent memory file system, the snapshot image as part of the snapshot; and
adding a hierarchical reference to the snapshot image.

14. A non-transitory machine readable medium comprising instructions, which when executed by a machine, causes the machine to:
store a snapshot of a frontend file system, wherein the snapshot captures a first portion of data of the frontend file system stored within a storage device by a storage file system, and wherein the snapshot includes a snapshot image that captures a second portion of the data of the frontend file system stored within persistent memory by a persistent memory file system;
in response to receiving a snapshot request to delete the snapshot, delete the first portion of the data of the frontend file system from the storage device as part of deleting the snapshot;
in response to the first portion of the data being deleted, remove a reference within a namespace of the persistent memory file system to the snapshot image that is part of the snapshot; and
queue the snapshot image for subsequent deletion of blocks storing the second portion of the data of the frontend file system from the persistent memory file system.

15. The non-transitory machine readable medium of claim 14, wherein the instructions cause the machine to:
process client operations while the snapshot image is queued for subsequent deletion.

16. The non-transitory machine readable medium of claim 14, wherein the instructions cause the machine to:
acknowledge the snapshot request as complete while the snapshot image is queued for subsequent deletion.

17. The non-transitory machine readable medium of claim 16, wherein the instructions cause the machine to:
subsequent to acknowledging the snapshot request as complete, traverse the persistent memory file system to free pages within the persistent memory file system that comprise the blocks of the snapshot image to delete.

18. A computing device comprising:
a memory comprising machine executable code; and
a processor coupled to the memory, the processor configured to execute the machine executable code to cause the computing device to:
storing data, of a frontend file system exposed for client access, across a storage device used by a storage file system to store a first portion of the data and persistent memory used by a persistent memory file system to store a second portion of the data;
in response to receiving a restore request to restore the persistent memory file system and the storage file system to a state of a snapshot, fence the persistent memory file system and the storage file system to block operations directed to the persistent memory file system and the storage file system;

restore the storage file system to the state of the snapshot, wherein the snapshot is used to restore the first portion of the data to the storage file system;

restore the persistent memory file system to a state of a snapshot image that is part of the snapshot, wherein the snapshot image is used to restore the second portion of the data to the persistent memory file system; and unfence the persistent memory file system and the storage file system.

19. The computing device of claim 18, wherein the machine executable code causes the computing device to:
increase a reference count of the snapshot image so that an active file system points to the snapshot image.

20. The computing device of claim 18, wherein the machine executable code causes the computing device to:
in response to the computing device experiencing a failure during implementation of the restore request, clear state information within the persistent memory file system.

21. A system comprising:
a processor; and
a persistent memory; and
a frontend file system providing a client device with access to data stored across persistent memory used by a persistent memory file system to store a first portion of the data and across a storage device used by a storage file system to store a second portion of the data; and
a node hosting the persistent memory file system and the storage file system as separate file systems, wherein the node:
creates, through the storage file system, a snapshot of the storage device to include the second portion of the data of the frontend file system stored through the storage file system; and
creates, through the persistent memory file system, a snapshot image to include the first portion of the data of the frontend file system stored through the persistent memory file system, wherein the snapshot image is created as part of the snapshot.

22. The system of claim 21, wherein the node hosts a persistent memory tier that enables forwarding of modify operations from the persistent memory tier to a file system tier of the node for execution through the storage file system, wherein the forwarding is enabled in response to an indication from the file system tier that a snapshot operation is to be implemented.

23. The system of claim 21, wherein the node hosts a persistent memory tier that initiates framing to notify the storage file system of blocks within the persistent memory file system that comprise more up-to-date data than corresponding blocks within the storage file system, wherein the framing is initiated in response to an indication from a file system tier that a snapshot operation is to be implemented.

* * * * *